United States Patent
Ogawa et al.

(10) Patent No.: US 9,964,939 B2
(45) Date of Patent: May 8, 2018

(54) TRAJECTORY DISPLAY DEVICE FOR DISPLAYING TRAJECTORY OF TOOL AXIS

(71) Applicant: FANUC CORPORATION, Minamitsuru-gun, Yamanashi (JP)

(72) Inventors: Hajime Ogawa, Yamanashi (JP); Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 96 days.

(21) Appl. No.: 15/137,124

(22) Filed: Apr. 25, 2016

(65) Prior Publication Data
US 2016/0320764 A1    Nov. 3, 2016

(30) Foreign Application Priority Data

Apr. 28, 2015 (JP) ................................ 2015-091775

(51) Int. Cl.
*G05B 15/02* (2006.01)
*G05B 19/19* (2006.01)

(52) U.S. Cl.
CPC .............. *G05B 19/19* (2013.01); *G05B 15/02* (2013.01); *G05B 2219/39219* (2013.01); *Y02P 20/52* (2015.11)

(58) Field of Classification Search
CPC ................... G05B 15/02; G05B 19/19; G05B 2219/39219; Y02P 20/52
See application file for complete search history.

(56) References Cited

U.S. PATENT DOCUMENTS

| 5,101,363 A | 3/1992 | Rutkowski |
| 8,018,192 B2 * | 9/2011 | Iwashita ............ G05B 19/4068 318/560 |
| 8,190,287 B2 * | 5/2012 | Iwashita ............ G05B 19/4097 318/565 |
| 9,304,507 B2 | 4/2016 | Tezuka et al. |
| 2006/0229761 A1 * | 10/2006 | Kita .................... G05B 19/4068 700/181 |

(Continued)

FOREIGN PATENT DOCUMENTS

| CN | 102640067 A | 8/2012 |
| CN | 102866671 A | 1/2013 |

(Continued)

OTHER PUBLICATIONS

Chinese Office Action for Chinese Application No. 201610274686.2, dated Sep. 22, 2017, including English language translation, 9 pages.

*Primary Examiner* — Abdelmoniem Elamin
(74) *Attorney, Agent, or Firm* — RatnerPrestia (57) ABSTRACT

A trajectory display device comprises a position information acquisition part acquiring position information of a drive axis of a machine tool, a tool coordinate calculation part calculating the coordinate value of a tool tip point based on the position information, and a tool vector calculation part setting a tool vector along the tool axis with the tool tip point as the starting point. The trajectory display device comprises an intersection calculation part calculating the coordinate values of the intersection points of the tool vector with preset flat planes and a display part displaying the tool axis trajectories represented by a line connecting the intersection points.

6 Claims, 9 Drawing Sheets

(56) References Cited

U.S. PATENT DOCUMENTS

| | | | |
|---|---|---|---|
| 2007/0156278 A1* | 7/2007 | Hiraga | G05B 19/406 700/184 |
| 2011/0046773 A1* | 2/2011 | Iwashita | G05B 19/4097 700/182 |
| 2012/0215334 A1 | 8/2012 | Tanuma et al. | |
| 2012/0283862 A1* | 11/2012 | Nonaka | G05B 19/4069 700/97 |
| 2013/0338816 A1 | 12/2013 | Tezuka et al. | |

FOREIGN PATENT DOCUMENTS

| | | |
|---|---|---|
| CN | 102955449 A | 3/2013 |
| CN | 103064343 A | 4/2013 |
| JP | H11272318 A | 10/1999 |
| JP | 4689745 | 5/2011 |
| JP | 2013257809 A | 12/2013 |

\* cited by examiner

TRAJECTORY DISPLAY DEVICE FOR DISPLAYING TRAJECTORY OF TOOL AXIS

BACKGROUND OF THE INVENTION

1. Field of the Invention

The present invention relates to a trajectory display device for displaying a trajectory of a tool axis.

2. Description of the Related Art

Machine tools carry out machining by changing the relative position of a tool relative to an object to be machined along a plurality of drive axes. In machine tools with drive axes including a rotational axis, machining is carried out while changing the posture of the tool with respect to the object to be machined. In such machine tools, calculating and displaying the tool tip point trajectories based on the position information of each of the drive axes and the configuration of the machine tool is known.

Japanese Patent No. 4689745 discloses a machine tool which calculates three-dimensional coordinate values for the tool tip as viewed from a coordinate system fixed to a workpiece and displays three-dimensional trajectory of a tool tip using three-dimensional coordinate values. In this machine tool, the start point of a tool vector is a point on the tool central axis separated from the tip of the tool by a preset distance to the root thereof. The machine tool calculates the three-dimensional coordinate value of the start point of the tool vector as viewed from the coordinate system fixed to the workpiece, using the actual position information and the information about the mechanical structure of the machine tool. Further, the line connecting the tool vector start point and the tip of the tool is displayed as a tool vector.

The tool used when machining a workpiece by a machine tool, other than a tool whose tip carries out machining, can be a tool whose side face machines a workpiece like an end mill. The surface of the product may be the surface which was machined by the side face of the tool. Accordingly, it is preferable that errors with respect to the design value of the machined surface machined by the side face of the tool be small. For example, it is preferable the error between the actual position of the tool or inclination thereof be small with respect to the movement command of the tool.

The error when the machined surface is machined by the side face of the tool corresponds to the error in the position or the posture of the axis of the tool. Accordingly, by estimating the error of the axis of the tool, the error of the machined surface can be estimated. For example, when the axis of the tool moves in compliance with a command value as instructed by the control device, the error of the machined surface will decrease.

In the above Japanese Patent No. 4689745, the tool vector can be displayed. However, the trajectory of the axis of the tool when cutting a workpiece at a predetermined flat plane cannot be displayed. As it is difficult to confirm whether or not the trajectory of the axis of the tool is the desired trajectory for the portion machined by the side face of a tool, there is room for improvement.

SUMMARY OF INVENTION

The trajectory display device for displaying a trajectory of a tool axis of the present invention comprises a position information acquisition part which acquires position information of a drive axis of a machine tool over a time series, and a tool coordinate calculation part which calculates a coordinate value of a tool tip point based on the position information and information on the configuration of the machine tool. The trajectory display device comprises a tool vector calculation part which sets a tool vector connecting the tool tip point and a point away from the tool tip point along the tool axis by a predetermined length. The trajectory display device comprises an intersection calculation part which calculates the coordinate value of intersection points of the tool vector with a predetermined flat plane and a display part which displays a trajectory of the tool axis in the flat plane, obtained by connecting the intersection points by a line.

In the above invention, the intersection calculation part can calculate the coordinate values of the intersection points of a plurality of predetermined flat planes and the tool vector, and the display part displays a plurality of tool axis trajectories.

In the above invention, the display part can display the tool axis trajectory when viewed from a predetermined direction.

In the above invention, the display part can display overlapping images of the plurality of tool axis trajectories when viewed from a predetermined direction.

In the above invention, the position information can include at least one of a position command value of the drive axis generated by a numerical control device of the machine tool, and a detection value detected by a position detector which detects an actual position of the drive axis.

In the above invention, the display part can display an image in which the tool axis trajectory generated based on the position command value is superimposed on the tool axis trajectory generated based on the detection value of the position detector.

DETAILED DESCRIPTION

The trajectory display device according to an embodiment will be described with reference to FIGS. 1 to 13. The trajectory display device of the present embodiment displays a tool axis trajectory in any flat plane specified by a worker. Further, the trajectory display device displays a tool axis trajectory for the portion of a tool whose side face machines a workpiece.

Figure 1:
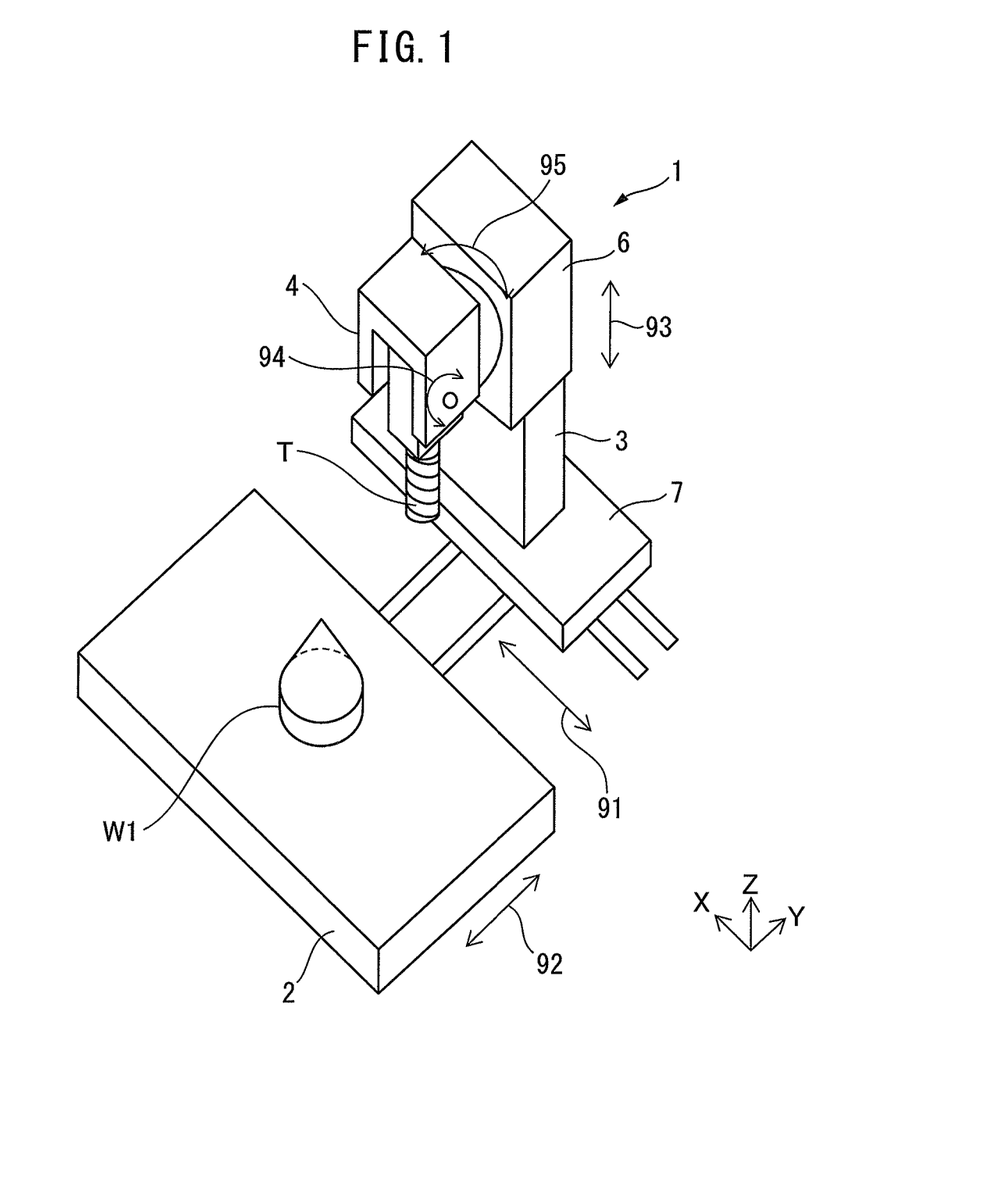
FIG. 1 is a schematic perspective view of a machine tool according to an embodiment.

FIG. 1 is a perspective view of a machine tool for which a trajectory display device according to the present embodiment is provided. In the present embodiment, a machine tool 1 with five drive axes will be exemplified and explained. The machine tool 1 is provided with a table 2 to which a workpiece W1 is secured and a base 7. Machine tool 1 comprises a support post 3 secured to the base 7. The machine tool 1 comprises a support member 6 which moves in the direction shown by arrow 93 with respect to the support 3, and a head 4 supported by the support member 6. A tool T is supported by the head 4.

The machine tool 1 comprises a drive device for changing the relative position and posture of the tool T with respect to the workpiece W1. The drive device of the present embodiment moves the base 7 in the direction of the X-axis indicated by the arrow 91. The drive device moves the table 2 in the direction of the Y-axis indicated by 92. The drive device moves the support member 6 in the direction of the Z-axis indicated by 93. Further, the drive device rotates the tool T around the A-axis with respect to the head 4 as indicated by arrow 94. The drive device rotates the head 4 around the B-axis with respect to the support 6 as indicated by arrow 95. The machine tool 1 of the present embodiment is formed so that the axial line of the A-axis and the axial line of the B-axis serving as the rotation axes intersect.

In this way the drive device of the present embodiment controls the relative position and the posture of the tool T with respect to the workpiece W1 by drive axes consisting of three linear axes (X-axis, Y-axis and Z-axis) and two rotary axes (A-axis and B-axis). Further the workpiece W1 is machined while changing the relative position and posture by the drive device. The drive device is not limited hereto, but any device which can change the relative position and posture of a tool with respect to a workpiece may be adopted.

Figure 2:
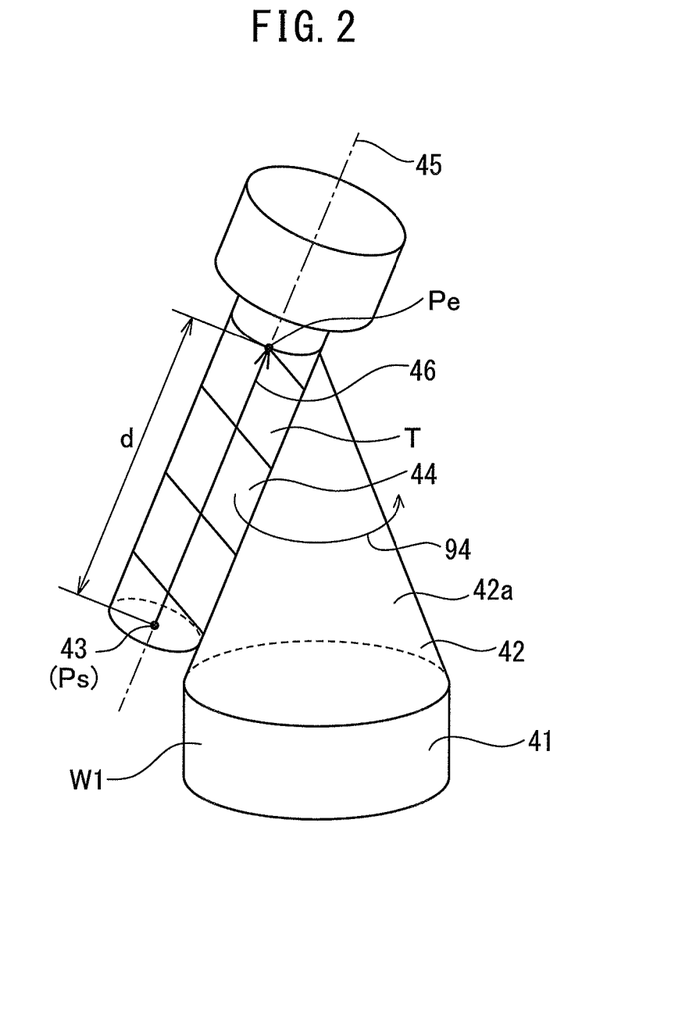
FIG. 2 is a schematic perspective view of a tool and workpiece used in the machining method according to an embodiment.

FIG. 2 is a schematic perspective view of the tool and workpiece when machining a workpiece using the machine tool according to the present embodiment. The tool T of the present embodiment is a flat end mill. The workpiece W1 is cut using a side face 44 of the tool T. The workpiece W1 has a cylindrical part 41 and a conical part 42. When the surface 42a of the conical part 42 is machined, the tool T is arranged so that tool axis 45, which is an axial line of the tool T, is parallel to the desired shape of the surface 42a. The tool axis 45 corresponds to the rotary axis about which the tool T rotates. Further, as indicated by arrow 94 while changing the posture of the tool T, the surface 42a is machined. The tool T has a predetermined tool tip point 43. The tool tip point 43 is, for example, defined by the point of the tip of the tool T on the tool axis 45. In the present embodiment, the coordinate value of the tool tip point 43 represents the position of the tool T.

Figure 3:
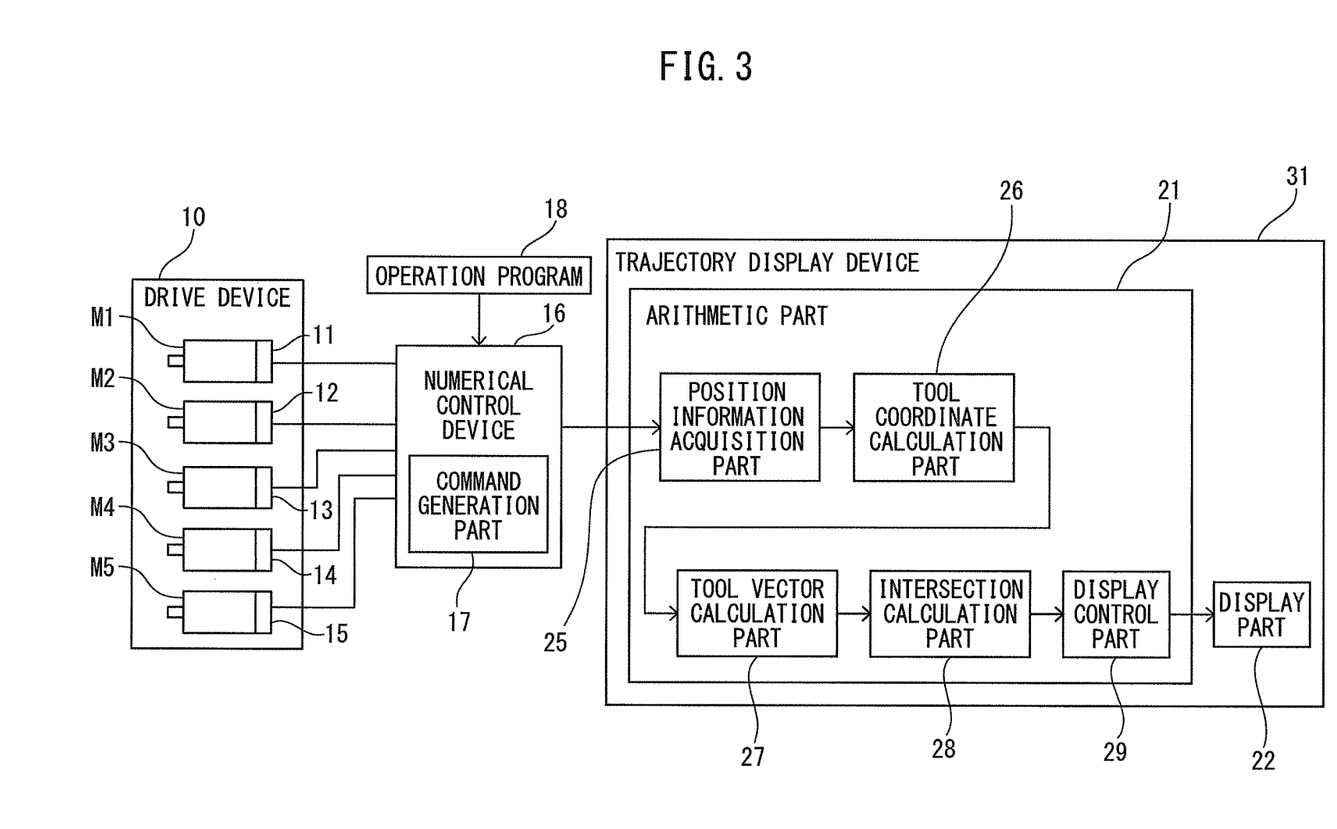
FIG. 3 is a block diagram of a machine tool according to an embodiment.

FIG. 3 is a block diagram of the machine tool of the present embodiment. The machine tool 1 comprises a numeric control device 16 for controlling the drive device 10, and a trajectory display device 31 for displaying the trajectory of the tool axis 45 in a predetermined flat plane. The trajectory display device 31 is connected to the numerical control device 16.

The drive device 10 comprises five motors M1 to M5 which drive respective drive axes. The motors M1 to M5 are provided with position detectors 11 to 15 which detect at each predetermined control period the actual position of each of the drive axes. The position detectors 11 to 15 of the present embodiment are composed of encoders attached to motors M1 to M5 which detect the rotation angle.

The operation program 18 based on which the machine tool 1 is operated is created beforehand by a worker. The numerical control device 16 includes a command generation part 17 which creates a position command for each predetermined control period with respect to each drive axis. The command generation part 17 creates a position command for each drive axis based on the operation program 18 input into the numerical control device 16. The command generation part 17 calculates the speed command for each drive axis based on the position command and calculates a current command based on the speed command. The motors M1 to M5 are driven by the current supplied based on the current command.

The trajectory display device 31 is equipped with a arithmetic part 21 and a display part 22. The arithmetic part 21 calculates the trajectories of the tool axis. The trajectory of the tool axis of the present embodiment is the trajectory through which the tool axis 45 has passed. As the trajectory of the tool axis, the trajectory of a portion of the tool axis 45 corresponding to the blade which actually machines the workpiece can be adopted. Namely, as will be described, the trajectories of the tool vector can be adopted.

As the machining by the tool T is carried out, the trajectory of the tool axis is represented by a face. When this planar (sheet-like) trajectory of the tool axis is cut with a predetermined flat plane, the trajectory of the tool axis in the cut plane is represented by a line. In the present embodiment, such a linear tool axis trajectory is calculated.

The display part 22 displays the image resulting from the calculation by the arithmetic part 21. The numerical control device 16 and the arithmetic part 21 are each composed of an arithmetic operation device having a CPU (Central Processing Unit), a RAM (Random Access Memory), and a ROM (Read Only Memory) etc., mutually connected via a bus. Note that the numerical control device 16 may be provided with the function of the arithmetic part 21. Namely, an arithmetic operation unit having the function of the numerical control device 16 and the arithmetic part 21 may be provided. The display part 22 is configured of a display panel etc.

Figure 4:
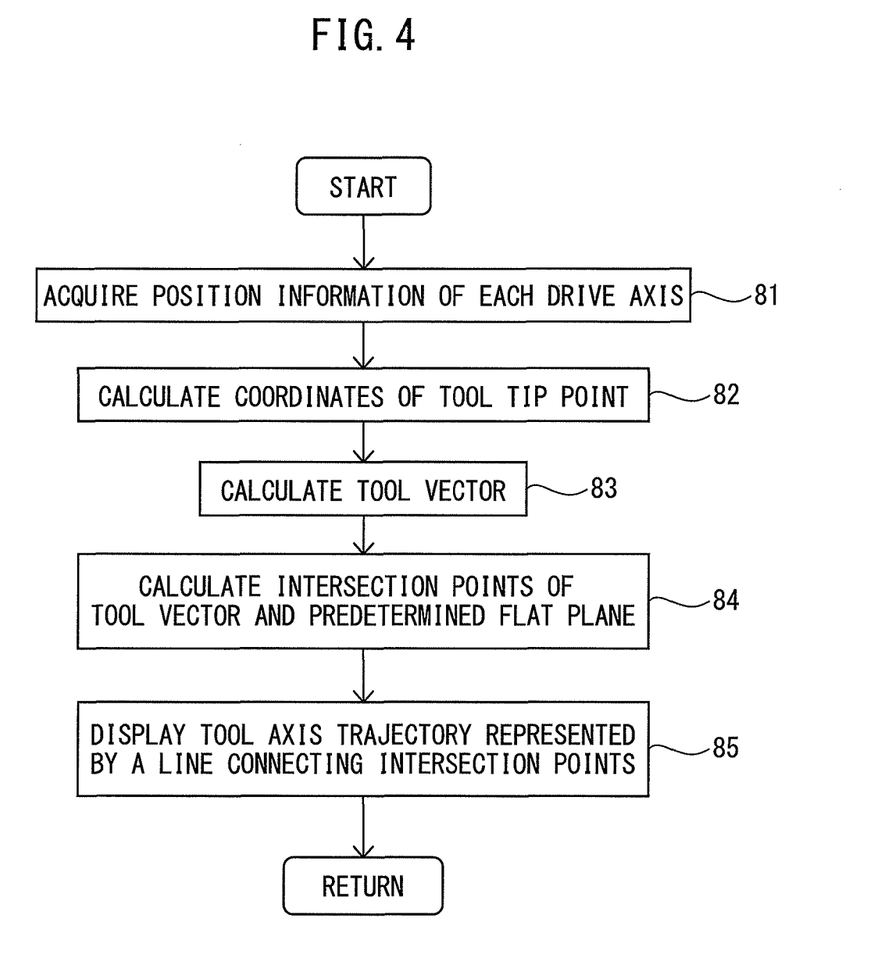
FIG. 4 is a flowchart for explaining the control of the trajectory display device according to an embodiment.

FIG. 4 is a flowchart for explaining the control of the trajectory display device according to the present embodiment. With reference to FIGS. 3 and 4, the arithmetic part 21 includes a position information acquisition part 25, a tool coordinate calculation part 26 and a tool vector calculation part 27. Furthermore, the arithmetic part 21 includes an intersection calculation part 28 and a display control part 29.

In step 81, the position information acquisition part 25 acquires position information of the drive axis at each predetermined interval of time along with the time. Namely, the position information acquisition part 25 acquires the position information of the drive axis over a time series. The position information acquisition part 25 of the present embodiment acquires position command values for each control period created by the command generation part 17 as time series data. Furthermore, the position information acquisition part 25 acquires detected values of each drive axis detected by the position detectors 11 to 15 as time series data. The arithmetic part 21 has a storage part and the acquired time series data are temporarily stored in the storage part. First, the generation of a position command value generated by the command generation part 17 as position information for the drive axes will be given as an example and explained.

In step 82, the tool coordinate calculation part 26 calculates the coordinate value of the tool tip point 43 of the tool T based on the position command value and the configuration of the machine tool 1. The configuration of the machine tool 1 includes information about the configuration of the drive axes and the type and dimensions of the tool T. The configuration of the machine tool 1 is entered into the arithmetic part 21 beforehand. The tool coordinate calculation part 26 calculates the coordinate value of the tool tip point 43 of the time series by making the position command value of the time series correspond thereto.

In the machine tool 1 of the present embodiment, a coordinate system with an arbitrary fixed point as the origin is set. Namely, the machine coordinates are set. The axis line of A-axis and the axis line of B-axis serve as the rotary axes of the machine tool 1 intersect at an intersection point M. The coordinate value of the intersection point M can be expressed by (x(t),y(t),z(t)) as a function of time t.

The reference positions (origins) of the A-axis and B-axis are those when the tool T is oriented in the vertically downward direction, namely, when the tool axis 45 of the tool T is parallel to the Z-axis and the tool tip point 43 is oriented in the negative direction of the Z-axis. At the reference positions, the rotation angles with respect to A-axis and B-axis are zero.

By using the distance L from the intersection point M to the tool tip point 43, the coordinate values (PosX(t),PosY(t),PosZ(t)) of the tool tip point 43 may be expressed by the following formulae (1) to (3).

$$PosX(t)=x(t)+L\times\cos(a(t))\times\sin(b(t)) \quad (1)$$

$$PosY(t)=y(t)+L\times\sin(a(t)) \quad (2)$$

$$PosZ(t)=z(t)-L\times\cos(a(t))\times\cos(t)) \quad (3)$$

a(t): position of A-axis at time t (rotation angle)
b(t): position of B-axis at time t (rotation angle)

Next, in step 83, the tool vector calculation part 27 calculates the tool vector based on the position of the tool tip point 43. FIG. 2 illustrates the tool vector 46. The tool vector 46 of the present embodiment has the start point Ps which is defined by the tool tip point 43 and the end point Pe which is defined by a point on the tool axis 45 which extends from the tool tip point 43 toward the intersection point M. The distance between the start point Ps and the end point Pe is preset to be a length d.

In this case, the tool vector 46 can be set corresponding to an area in which machining can be carried out by the side face 44 of the tool T. The length d of the tool vector 46 can be set so as not to include a shank part holding the tool T. For example, the length d can be set to be a blade length which is the length of the portion forming the blade portion of the tool T.

The direction (posture) of the tool axis 45 of the tool T can be calculated based on the position of the A-axis (rotation angle) and the position of the B-axis (rotation angle). The coordinate values (PosX'(t),PosY'(t),PosZ'(t)) of the end point Pe of the tool vector 46 can be expressed by the following formulae (4) to (6).

$$PosX'(t)=x(t)+(L-d)\times\cos(a(t))\times\sin(b(t)) \quad (4)$$

$$PosY'(t)=y(t)+(L-d)\times\sin(a(t)) \quad (5)$$

$$PosZ'(t)=z(t)-(L-d)\times\cos(a(t))\times\cos(b(t)) \quad (6)$$

In this way a plurality of tool vectors can be calculated over a time series. Note that the start point of the tool vector may be a predetermined position on the tool axis 45 and the end point may be the tool tip point. Namely, the tool vector can be configured to connect the tool tip point to a point a predetermined distance away from the tool tip point along the tool axis.

Figure 5:
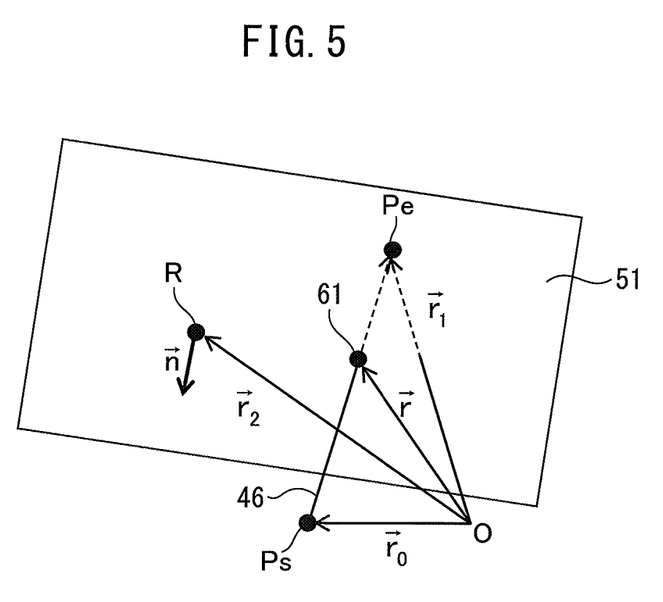
FIG. 5 is an explanatory schematic diagram of the intersection point of a tool vector and flat plane.

FIG. 5 is a schematic diagram which explains the method of calculating the intersection point of the tool vector and a flat plane. With reference to FIGS. 2 to 5, in step 84, the intersection calculation part 28 calculates the coordinate value of the intersection point 61 of the tool vector 46 and the predetermined flat plane 51. As the flat plane 51, any flat plane which intersects the shape of the workpiece W1 after machining may be adopted. Further, the flat plane 51 may be any flat plane which intersects the after-mentioned sheet-like trajectory S1 of the tool axis. The flat plane 51 may be determined beforehand by the worker. The flat plane 51 can be specified by any reference point R on the flat plane 51 and a normal vector of the flat plane 51.

In the present embodiment, the tool tip point 43 defines the start point Ps of the tool vector 46. A point on the tool axis 45 defines the end point Pe of the tool vector 46. The tool vector 46 intersects the flat plane 51 at the intersection point 61. The coordinate values of the intersection point 61 of the tool vector 46 and the flat plane 51 can be calculated based on the following formula (7) using the position vector of each point.

$$\vec{r} = \vec{r}_0 + \frac{(\vec{r}_2 - \vec{r}_0)\vec{n}}{(\vec{r}_1 - \vec{r}_2)\vec{n} + (\vec{r}_0 - \vec{r}_2)\vec{n}}(\vec{r}_1 - \vec{r}_0) \quad (7)$$

$$= \vec{r}_0 + \frac{(\vec{r}_2 - \vec{r}_0)\vec{n}}{(\vec{r}_1 - \vec{r}_2)\vec{n}}(\vec{r}_1 - \vec{r}_0)$$

$\vec{n}$: normal vector of a plane
$\vec{r}$: position vector of intersection point
$\vec{r}_0$: position vector of tool vector start point
$\vec{r}_1$: position vector of tool vector end point
$\vec{r}_2$: position vector of reference point In this way, the coordinate values of the intersection point 61 of the tool vector 46 and the flat plane 51 can be calculated. Further, a plurality of intersection points 61 of the tool vectors 46 and the flat plane 51 are calculated over a time series. The coordinate values of the plurality of intersection points 61 over the time series can be calculated.

Figure 6:
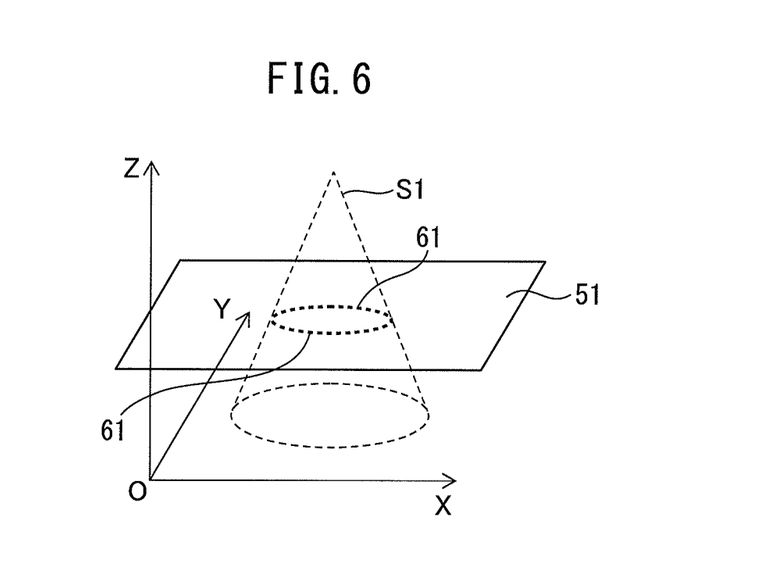
FIG. 6 is a schematic perspective view explaining the intersection points between the flat plane and the planar tool axis trajectory.

FIG. 6 shows a schematic diagram illustrating the intersection points of the tool vectors and the flat plane. According to the movement of the tool axis 45, a sheet-like trajectory S1 of the tool axis is generated. The sheet-like tool axis trajectory S1 corresponds to the shape of the workpiece W1 after machining. In this embodiment the sheet-like tool axis trajectory S1 corresponds to the shape of the cone part 42 of the workpiece W1. For example, the sheet-like tool axis trajectory S1 has a larger size than the size of the workpiece W1 by the length corresponding to the radius of the tool.

The plurality of intersection points 61 calculated for each predetermined control period correspond to the points illustrating the trajectory of the tool axis when the workpiece is cut by the flat plane 51. A line connecting the plurality of intersection points 61 corresponds to a cross-sectional shape of the sheet-like tool axis trajectory S1. Further, the line connecting the plurality of intersection points 61 corresponds to the tool axis trajectory in the flat plane 51.

Namely, the linear tool axis trajectory in the predetermined flat plane corresponds to the cross-sectional shape of the sheet-like tool axis trajectory. Further, in the present embodiment, in order to calculate the intersection points 61 using the tool vectors 46, the line connecting the plurality of intersection points 61 also represents the trajectory of the tool vectors 46 in the flat plane 51.

With reference to FIGS. 3 and 4, next, in step 85, the display control part 29 acquires the coordinate values of the intersection points 61 from the intersection calculation part 28. The display control part 29 sends to the display part 22, the command to display the trajectory of the linear tool axis obtained by connecting the intersection points 61 with a line. The display part 22 displays the trajectory of the tool axis in the flat plane based on a command from the display control part 29. As the line connecting the intersection points 61, any line such as a straight line or a curved line approximated to pass through the intersection points 61, etc., may be adopted. The displayed image represents the linear tool axis trajectory in the cut surface when the work piece or the sheet-like tool axis trajectory is cut by any flat plane.

Figure 7:
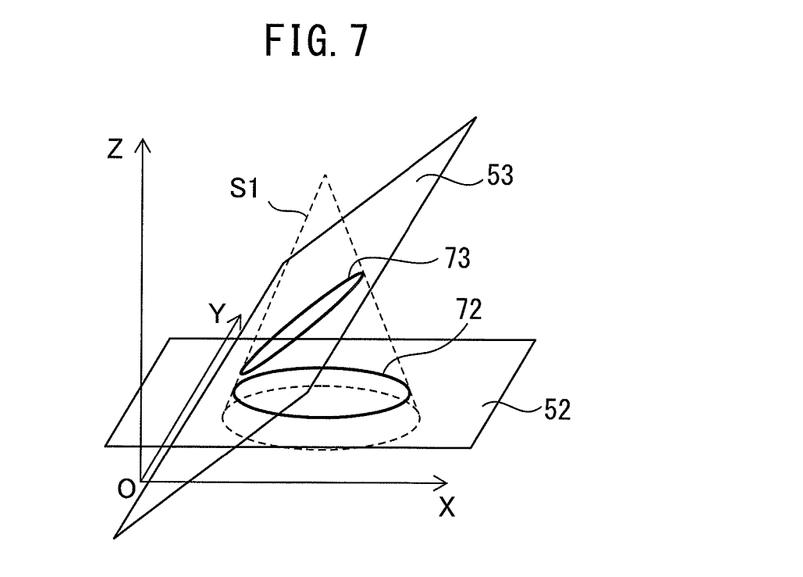
FIG. 7 is a first image of the tool axis trajectories displayed on the display part.

FIG. 7 shows the first image of the tool axis trajectory displayed on the display part. In the image of the present embodiment, an image of the sheet-like tool axis trajectory S1 corresponding to the conical part 42 of the workpiece W1 is displayed. The first image is illustrated as a three dimensional image in a perspective view. The linear tool axis trajectory 72 in the flat plane 52 is illustrated. Note that, the flat plane 52 is a flat plane perpendicular to the Z-axis.

The flat plane by which the sheet-like tool axis trajectory S1 is cut, can be arbitrarily set by a worker. FIG. 7 illustrates a flat plane 53 inclined with respect to the X and Z axes as well as the linear tool axis trajectory 73 in the flat plane 53. In this way, by calculating the positions of the intersection points 61 of the plurality of flat planes 52 and 53 specified by a worker with the tool vector 46, a plurality of tool axis trajectories can be displayed on the display part 22.

The trajectory display device 31 of the present embodiment can display the tool axis trajectory in any flat plane on the display part 22. In particular, the trajectory display device 31 can display the tool axis trajectory in a flat plane inclined at a desired angle. Because of this, the movement state of the tool with respect to the workpiece can be evaluated. For example, it is possible to confirm whether there is an abnormality such as vibrations or shaking in the tool axis. Further, the shape of the workpiece after machining corresponds to the tool axis trajectory. Therefore, by carrying out an evaluation of the tool axis trajectory, an evaluation of the shape of the workpiece after machining may be carried out. Without actually measuring the machined workpiece, the shape of the workpiece after machining can be evaluated. As a result, in the case of poor machining accuracy, adjusting the machine tool or correcting the operation program may be carried out.

In particular, when machining is carried out by the side face of the tool, the machining accuracy of the machined surface changes depending on the tool posture. Because of this, the influence on the machined surface cannot be correctly evaluated merely by the tool tip point trajectory. In respect thereto, in the present embodiment, by carrying out an evaluation on the tool axis trajectory, an evaluation of the machining accuracy for the portion machined by the side face of the tool can be carried out.

Figure 8:
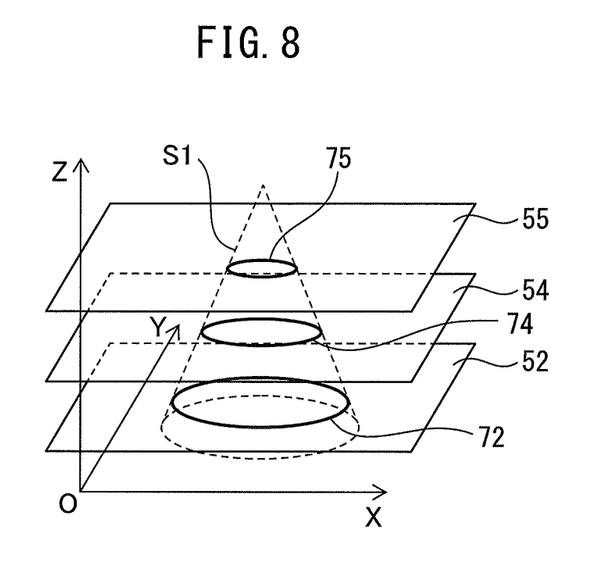
FIG. 8 is a second image of the tool axis trajectories displayed on the display part.

FIG. 8 shows the second image displayed on the display part. In the second image, a sheet-like tool axis trajectory S1 is cut by a plurality of flat planes 52, 54 and 55. The flat planes 52, 54 and 55 are mutually parallel. In each of the flat planes 52, 54 and 55, a cross-sectional shape of the sheet-like tool axis trajectory S1, namely linear tool axis trajectories 72, 74 and 75 are displayed.

Figure 9:
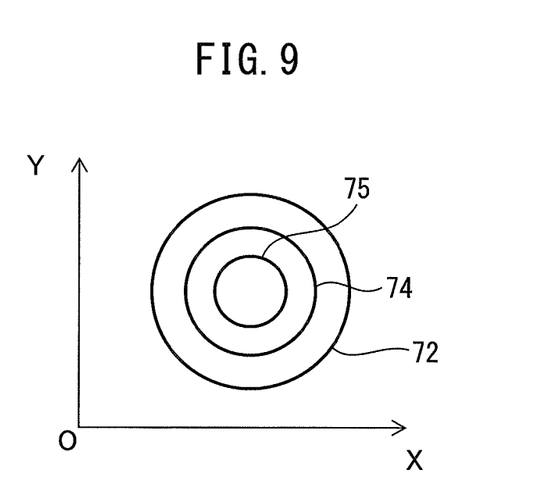
FIG. 9 is a third image of the tool axis trajectories displayed on the display part.

FIG. 9 illustrates the third image displayed on the display part. The third image is an image of the linear tool axis trajectories 72, 74 and 75 illustrated in FIG. 8 when viewed from a predetermined direction. Namely, it is an image of the plurality of the tool axis trajectories 72, 74 and 75 projected onto one flat plane. This example illustrates the plurality of tool axis trajectories as viewed facing the negative side of the Z-axis. Further, superimposed images of the plurality of tool axis trajectories are illustrated. The direction of display can be set by the worker. The display control part 29 sends to the display part 22, commands for displaying an image of the superimposed plurality of tool axis trajectories when viewed from a predetermined direction. The display part 22 displays the image according to the display command.

In this way, the trajectory display device 31 can display the linear tool axis trajectories in a plurality of mutually parallel flat planes on one two-dimensional graph. By adopting such a configuration, a plurality of tool axis trajectories may be evaluated at once. Further, a comparison between the plurality of tool axis trajectories themselves may be carried out. For example, in the example of the third image illustrated in FIG. 9, in the height direction of the workpiece 1, the round shape of the tool axis trajectories 72, 74 and 75 can be evaluated for deviations or distortions.

Note that there are cases when a flat plane specified by the worker is not parallel to any of the XY flat plane, the YZ flat plane and the ZX flat plane. In such cases, the cutting plane can be made parallel to any of the XY flat plane, the YZ flat plane and the ZX flat plane by rotating the intersection points 61 or the linear tool axis trajectories on the three dimensional graph. According to such a configuration, even for an inclined cutting plane, the tool axis trajectories superimposed on a two dimensional graph may be displayed.

With reference to FIG. 3, in the aforementioned embodiment, the trajectory display device 31 calculates the tool axis trajectory using the position command value generated by the command generation part 17 as position information of the drive axes of the machine tool 1. The trajectory display device 31 can display the tool axis trajectory using the actual position of the drive axes as the position information of the drive axes. As the position information of the drive axes, the detection values for the drive axes detected by the respective position detectors 11 to 15 may be used. The trajectory display device 31 can display the tool axis trajectory in any flat plane in the same way as the previously described method based on the detection values of the position detectors 11 to 15. Further, the trajectory display device 31 can display the tool axis trajectory when the sheet-like tool axis trajectory is cut by any flat plane. The tool axis trajectory displayed at this time corresponds to a cross-sectional shape of the workpiece after machining.

Figure 10:
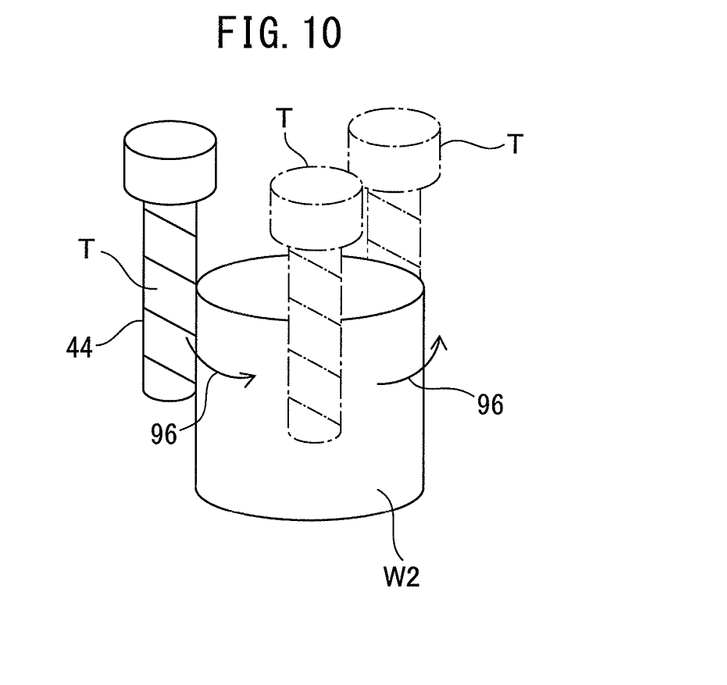
FIG. 10 is a schematic perspective view of a workpiece and a tool used in another machining method according to an embodiment.

FIG. 10 is a schematic perspective view of a workpiece and a tool in another machining method of the present embodiment. The workpiece W2 is formed in a cylindrical shape. In order to form the surface of the workpiece W2 in the circumferential direction, cutting work is carried out by the side face 44 of the tool T. The tool T is moved as illustrated by arrow 96. When forming a cylindrical workpiece W2, it is preferable that the diameter of the workpiece W2 be constant over the whole of the workpiece W2 in the axial direction. The trajectory display device 31 of the present embodiment is able to evaluate uneven machining in the radial direction.

Figure 11:
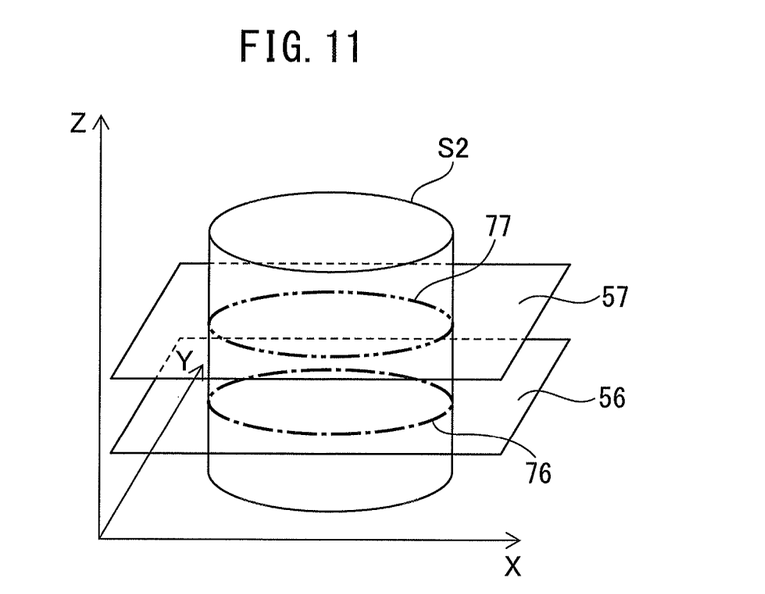
FIG. 11 is a fourth image of the tool axis trajectories displayed on the display part.

FIG. 11 shows the fourth image displayed on the display part when a workpiece is machined. In this example, linear tool axis trajectories 76 and 77 in flat planes 56 and 57 perpendicular to the Z-axis are displayed. The flat planes 56 and 57 are perpendicular to the axial line of the workpiece W2. The tool axis trajectories 76 and 77 are calculated using the detected values of the drive axes detected by the respective position detectors 11 to 15.

Figure 12:
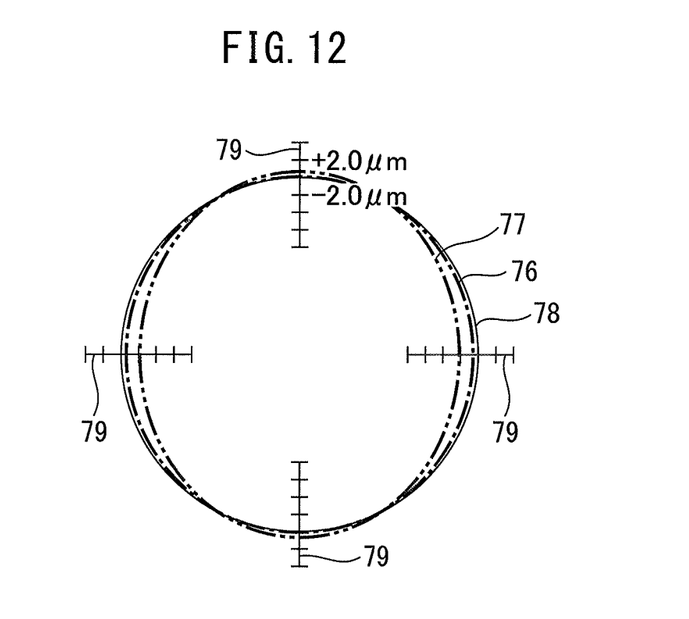
FIG. 12 is a fifth image of the tool axis trajectories displayed on the display part.

FIG. 12 illustrates the fifth image displayed on the display part. The fifth image is an image of two tool axis trajectories 76 and 77 as viewed from the Z-axis direction for the workpiece W2. Namely, the fifth image corresponds to an image obtained when the two tool axis trajectories 76 and 77 are projected in the XY flat plane. In FIG. 12, in addition to the actual tool axis trajectories 76, 77, the tool axis trajectory 78 generated based on position command value is displayed by a solid line. The tool axis trajectory 78 is constant in the height direction of the workpiece W2. Further, in the fifth image, a scale 79 which represents the length corresponding to the actual dimensions is displayed.

According to the fifth image, the tool axis trajectory 76 of the lower portion of the workpiece W2 is slightly smaller than the tool axis trajectory 78 based on the position command value. Further, the tool axis trajectory 77 of the upper portion of the workpiece W2 is smaller than the tool axis trajectory 76 of the lower portion of the workpiece W2. The size of the error of the tool axis trajectories can be estimated by the scale 79. In the workpiece W2, in any position in the height direction, an error in the radial direction of the tool axis trajectory can be evaluated.

Further, the display part 22 displays the superimposed images of a tool axis trajectory created based on the position command value and a tool axis trajectory created based on the detected values of the position detectors. By displaying the two overlapping tool axis trajectories when cut by the same flat plane, an evaluation of the deviation of the actual position of the drive axis from the position command value can be carried out. Further, based on the deviation of the calculated tool axis trajectory, fine adjustment of the machine tool, or correction of the operation program may be carried out. In this way, the drive axis position information may use at least one of the position command values of the drive axes created by the numerical control device of the machine tool and the detection values of the actual positions of the drive axes detected by the position detectors.

The signals output from the position detectors 11 to 15 may be adopted as the detected values of the position detectors. For example, there are cases when command generation part 17 of the numerical control device 16 is provided with a position feedback circuit using position information detected by the position detectors 11 to 15. In such cases, position feedback signals may be acquired as the detected values of the position detectors. Further, the position detectors are not limited to encoders attached to the motors of the drive axis and any detector which can detect the actual positions of the drive axes may be adopted. For example, the position detectors may be linear scales attached to the linear motion axes etc.

Figure 13:
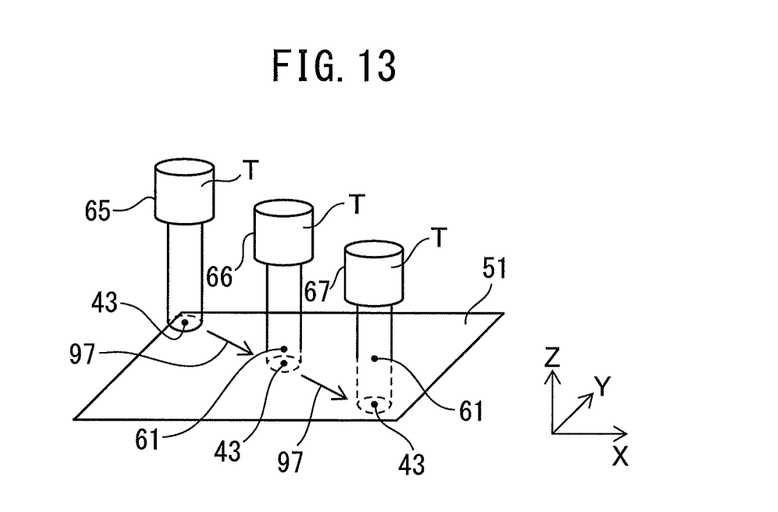
FIG. 13 is a schematic perspective view of the tool and a flat plane of an embodiment.

FIG. 13 is a schematic perspective view of the tool and a flat plane by which the workpiece is cut. The trajectory display device 31 of the present embodiment, calculates the intersection points of the tool vectors set at each predetermined control period and the flat plane. The tool vectors can be calculated based on the tool tip point during machining of the workpiece. However, there are cases during machining of the workpiece when the tool vector does not intersect the flat plane designated by the worker. When performing a calculation based on the aforementioned formula (7) and a solution cannot be obtained, it can be judged that the tool vector does not intersect the flat plane. However, when calculations with respect to all tool vector positions are performed, the calculation time will be long.

The arithmetic part 21 judges whether or not the tool vector 46 intersects the predetermined flat plane 51. Further, the arithmetic part 21 can perform a control to calculate the intersection point during intersection with the flat plane 51. When the tool vector 46 is not intersecting the flat plane 51, the calculator arithmetic part 21 can perform a control to prohibit the calculation of the intersection point 61.

In the example illustrated in FIG. 13, during the machining of the workpiece, as shown by arrow 97, after gradually approaching the flat plane 51, the tool T intersects the flat plane 51. As the tool T disposed at first position 65 does not contact the flat plane 51, the tool vector does not intersect the flat plane 51. The tool vector intersects the flat plane 51 at second position 66 and third position 67.

In this example, the flat plane 51 is perpendicular to the Z-axis. Before calculating the intersection point of the tool vector with the flat plane 51, it is judged whether or not the coordinate value of the Z-axis of the tool tip point 43 is larger than the coordinate value of the Z-axis of the flat plane 51. Further, when the coordinate value of the Z-axis of the tool tip point 43 is larger than the coordinate value of the Z-axis of the flat plane 51, a control may be performed to prohibit the calculation of the intersection point 61.

In this way, a condition under which the tool vector and the flat plane do not intersect can be preset. Further, when the tool vector and the flat plane do not intersect, the calculation of the intersection point of the tool vector with the flat plane can be prohibited. According to this configuration, the calculation time can be reduced.

The line obtained by moving the linear tool axis trajectory calculated in the present embodiment towards the inside of the workpiece by a length corresponding to the tool diameter corresponds to the cross-sectional shape of the workpiece. Therefore, the trajectory display device may be configured to calculate the cross-sectional shape of the workpiece based on the created tool axis trajectory and display the cross-sectional shape of the workpiece.

The tool in the present embodiment is a flat end mill but not being limited thereto, can use any tool whose side surface can machine a workpiece.

According to the present invention, a trajectory display device which displays a tool axis trajectory in a predetermined flat plane can be provided.

In the various controls stated above, the order of the steps may appropriately be changed provided the functions and mode of operation remain unmodified. The above embodiments can be appropriately combined. In each of the above-mentioned drawings the same or corresponding parts are assigned the same numerals. Note that, the above embodiments are exemplifications and do not limit the invention. Further, the present embodiments include the modifications of the embodiments indicated in the claims.

The invention claimed is:

1. A trajectory display device of a machine tool, the trajectory display device for displaying a trajectory of a tool axis comprising:
    a processor configured to:
        acquire position information of a drive axis of the machine tool over a time series;
        calculate a coordinate value of a tool tip point based on the position information and information on the configuration of the machine tool;

set a tool vector connecting the tool tip point and a point away from the tool tip point along the tool axis by a predetermined length;

calculate the coordinate values of intersection points of the tool vector with a predetermined flat plane, the predetermined flat plane intersecting a workpiece to be machined by the machine tool; and a display which displays a trajectory of the tool axis in the flat plane, obtained by connecting the intersection points by a line, the trajectory corresponding to a cross-sectional shape of the workpiece to be machined by the machine tool.

2. The trajectory display device according to claim 1, wherein the processor is further configured to calculate the coordinate values of the intersection points of a plurality of predetermined flat planes and the tool vector; and the display displays a plurality of tool axis trajectories.

3. The trajectory display device according to claim 1, wherein the display displays the tool axis trajectory when viewed from a predetermined direction.

4. The trajectory display device according to claim 2, wherein the display displays an overlapping image of the plurality of tool axis trajectories when viewed from a predetermined direction.

5. The trajectory display device according to claim 1, wherein the position information includes at least one of a position command value of the drive axis generated by a numerical control device of the machine tool, and a detection value detected by a position detector which detects an actual position of the drive axis.

6. The trajectory display device according to claim 5, wherein the display displays an image in which the tool axis trajectory generated based on the position command value is superimposed on the tool axis trajectory generated based on the detection value of the position detector.

* * * * *